United States Patent [19]
Park et al.

[11] Patent Number: 5,592,343
[45] Date of Patent: Jan. 7, 1997

[54] METHOD OF REPRODUCING DIGITAL VIDEO SIGNALS HAVING TRICK PLAY DATA

[75] Inventors: Goo-man Park, Seoul; Sei-hyun Baik; Taek-soo Han, both of Kyungki-do, all of Rep. of Korea

[73] Assignee: Samsung Electronics Co., Ltd., Suwon, Rep. of Korea

[21] Appl. No.: 436,668

[22] Filed: May 8, 1995

Related U.S. Application Data

[62] Division of Ser. No. 289,364, Aug. 11, 1994.

[30]    Foreign Application Priority Data

Jun. 30, 1994 [KR] Rep. of Korea .................. 94-15674

[51] Int. Cl.⁶ ..................................................... G11B 5/09
[52] U.S. Cl. ........................... 360/48; 386/71; 386/113
[58] Field of Search ............................. 360/53, 48, 10.1, 360/10.2, 10.3, 24, 38.1, 32, 19.1, 40; 358/261.2, 310, 312, 335, 337, 342, 343

[56]          References Cited

U.S. PATENT DOCUMENTS 5,245,483   9/1993   Van Gestel ........................ 360/40
5,377,051  12/1994   Lane et al. ...................... 360/10.1
5,446,597   8/1995   Matsumi et al. .................. 360/19.1

*Primary Examiner*—Aristotelis Psitos
*Assistant Examiner*—Patrick Wamsley
*Attorney, Agent, or Firm*—Cushman Darby & Cushman, IP Group of Pillsbury Madison & Sutro LLP

[57]            ABSTRACT

A digital video tape recording method for trick play includes the steps of dividing the data area of a video sector of respective tracks of the digital video tape into first, second and third regions, interspersely recording normal play data and trick play data in the first and third regions, and recording the normal play data in the second region, wherein the trick play data recorded in the first and third regions is frame data corresponding to the maximum odd-fold speed of a plurality of given odd-fold speeds, and the same trick play data is repeatedly recorded for a number of tracks equal to twice the number of the maximum odd-fold speed, thereby enabling satisfactory trick play at various odd-fold speeds and with various scanners.

11 Claims, 10 Drawing Sheets

FIG. 3

| | 31 | 32 | 33 | 34 | | | | |
|---|---|---|---|---|---|---|---|---|
| | DC | 1 | 5 | 6 | 14 | 15 | 27 | 28 |
| | 2 | 4 | 7 | 13 | 16 | 26 | 29 | 42 |
| | 3 | 8 | 12 | 17 | 25 | 30 | 41 | 43 |
| | 9 | 11 | 18 | 24 | 31 | 40 | 44 | 53 |
| | 10 | 19 | 23 | 32 | 39 | 45 | 52 | 54 |
| | 20 | 22 | 33 | 38 | 40 | 51 | 55 | 60 |
| | 21 | 34 | 37 | 47 | 80 | 56 | 59 | 61 |
| | 35 | 38 | 48 | 49 | 57 | 58 | 62 | 63 |

| SYNC BLOCK NO. | F1,F2 TRACK (+AZIMUTH) | F0 TRACK (−AZIMUTH) |
|---|---|---|
| 155 | | |
| 154 | | |
| 153 | | |
| 152 | | 15 |
| 151 | | 16 |
| 150 | | |
| 149 | 30 | e |
| 148 | 29 | i |
| 147 | | |
| 146 | | |
| 145 | | 17 |
| 144 | h | 18 |
| 143 | | 19 |
| 142 | 28 | |
| 141 | 27 | f |
| 140 | 26 | |
| 139 | 25 | |
| 138 | 24 | |
| 137 | | |
| 136 | | 20 |
| 135 | | 21 |
| 134 | | 22 |
| 133 | | 23 |
| 132 | | |
| 131 | 23 | g |
| 130 | 22 | |
| 129 | 21 | |
| 128 | 20 | |
| 127 | | |
| 126 | g | 24 |
| 125 | | 25 |
| 124 | | 26 |
| 123 | | 27 |
| 122 | | 28 |
| 121 | 19 | |
| 120 | 18 | h |
| 119 | 17 | |
| 118 | | |
| 117 | f | |
| 116 | | 29 |
| 115 | | 30 |
| 114 | | |
| 113 | 16 | i |
| 112 | 15 | |
| 111 | | |
| 110 | e | |

| SYNC BLOCK NO. | F1,F2 TRACK (+AZIMUTH) | F0 TRACK (−AZIMUTH) |
|---|---|---|
| 109 | | |
| . | | |
| . | | |
| 61 | | |
| 60 | | |
| 59 | | |
| 58 | | |
| 57 | | |
| 56 | | 1 |
| 55 | | 2 |
| 54 | | |
| 53 | 14 | |
| 52 d | 13 | |
| 51 | | |
| 50 | 12 | |
| 49 | 11 | |
| 48 c | 10 | 3 |
| 47 | 9 | 4 |
| 46 | | 5 |
| 45 | | 6 |
| 44 | | 7 |
| 43 | | 8 |
| 42 | | |
| 41 | | |
| 40 | | |
| 39 | 8 | |
| 38 | 7 | |
| 37 b | 6 | |
| 36 | 5 | |
| 35 | 4 | 9 |
| 34 | 3 | 10 |
| 33 | | 11 |
| 32 | | 12 |
| 31 | | |
| 30 | | 13 |
| 29 | | 14 |
| 28 | | |
| 27 a | 2 | |
| 26 | 1 | |
| 25 | | |
| 24 | | |
| 23 | | |
| 22 | | |
| 21 | | |

: TRICK DATA

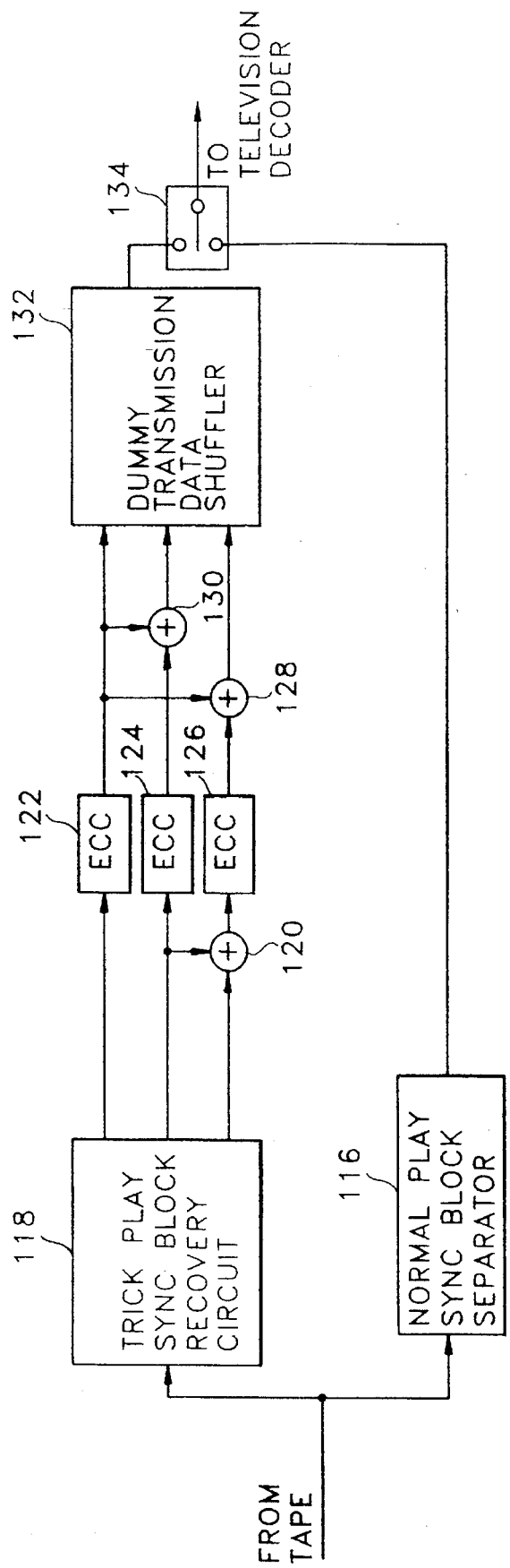

METHOD OF REPRODUCING DIGITAL VIDEO SIGNALS HAVING TRICK PLAY DATA

This is a division of application Ser. No. 08/289,364, filed Aug. 11, 1994, now U.S. Pat. No. 5,546,244.

BACKGROUND OF THE INVENTION

The present invention relates generally to a digital video tape recording/reproducing method, and more particularly, to a method for recording/reproducing video data for trick play in a digital video tape recording/reproducing apparatus which records/reproduces an advanced television signal.

Recently, a commercial-purpose digital video cassette recorder has been developed, which can record/reproduce the advanced television (ATV) signal on/from digital video tape for a standard-definition VCR. The bit stream of a standard-definition VCR is 24.9 megabits per second, whereas the bit stream of the ATV signal is 19.3 megabits per second. This leaves an area for recording 5.6 megabits per second on the video tape. There has been much investigation as to how best to record trick play data on the remaining video sectors and an unused audio sector in order to facilitate trick play reproduction of the ATV signal at various speeds, as well as to accomodate various types of scanners, and in order to improve picture quality and solve noise problems. The present invention, which resulted from one such investigation, encompasses a technique for recording trick play data in such a manner as to enable the realization of a desirable digital video tape player for the home.

A fundamental problem in digital video cassette recorder development lies in the recording format for special reproduction modes (trick play operation). The format must be structured such that two requirements—better picture quality and cost reduction—are satisfied.

One solution to the above problems is to allocate the trick play data throughout the entire scanning area, portions of which respectively correspond to each of a given set of playing speeds. This method can provide better picture quality for a reproduced image during trick play operation, but presents a drawback in that the correspondingly allocated area must be scanned, so that a servo control operation must be carried out with a high degree of precision, thereby increasing the cost and complexity of the VCR, and degrading the reliability thereof.

An alternative solution is to repetitively record the trick play data normally recorded on a pair of tracks onto a number of tracks which correspond to twice the maximum-fold playback speed. In accordance with this method, scanning is performed in the repetitively recorded area only, so that the servo control need not be so precise, which somewhat reduces cost and complexity. However, the repetitive recording may consume a large recording area, and the duration for displaying each still image is longer during low-speed playback than it is during high-speed playback. This lengthy interval between updated images tends to make the viewer impatient, and picture quality suffers as well.

SUMMARY OF THE INVENTION

To solve the above problems, it is an object of the present invention to provide a digital video tape recording/reproducing method for trick play operation which is compatible with a variety of scanners (heads).

It is another object of the present invention to provide a digital video tape recording/reproducing method which enables various odd-fold speeds of trick play.

It is still another object of the present invention to provide a digital video tape recording/reproducing method which improves the picture quality during low-speed trick play.

To accomplish the first and second objects, the present invention provides a digital video tape recording method for trick play in which ATV signals containing frame data supplied at predetermined intervals and independently decodable are divided into normal play data and trick play data are and recorded on digital video tape. This method includes the steps of dividing the data area of a video sector of respective tracks of the digital video tape into first, second and third regions, interspersingly recording the normal play data and trick play data in the first and third regions, and recording the normal play data in the second region, wherein the trick play data recorded in the first and third regions is frame data corresponding to a maximum odd-fold speed of a plurality of odd-fold speeds, and the same trick play data is repeatedly recorded for a number of tracks equal to twice the number of the maximum odd-fold speed.

To accomplish the third object of the present invention, there is provided a digital video tape recording method for trick play in which ATV signals containing frame data supplied at predetermined intervals and independently decodable are divided into normal play data and trick play data are and recorded on the digital video tape. This method includes the steps of repeatedly recording DC coefficients and first AC coefficients of respective DCT blocks of frame data corresponding to the maximum odd-fold speed of the frame data at predetermined locations of respective video sectors of a number of tracks equal to twice the number of the maximum odd-fold speed, the DC coefficients and first AC coefficients being supplied as trick play data for all odd-fold speeds; repeatedly recording second AC coefficients of respective DCT blocks of the selected frame data on a first region of respective audio sectors of tracks equal to twice the number of a second odd low speed, the second AC coefficients being supplied as part of trick play data for first and second odd low speeds; and repeatedly recording third AC coefficients of respective DCT blocks of the selected frame data on a second region of respective audio sectors of tracks equal to twice the number of a first odd low speed, the third AC coefficients being supplied as part of trick play data for the first odd low speed.

In another of its aspects, the present invention encompasses a digital video tape reproducing method which includes the steps of dividing data reproduced from a tape into normal play sync blocks, all odd-fold speed trick play sync blocks, second odd low-speed trick play sync blocks, and first odd low-speed trick play sync blocks; at odd high speeds, first error-correcting the divided trick play sync blocks for all odd-fold speeds by using error correction sync blocks thereof, and outputting high-speed trick play reproduced data; at odd low speeds, first error-correcting the divided trick play sync blocks for all odd-fold speeds by using error correction sync blocks thereof, outputting high-speed trick play data sync blocks, second error-correcting trick play sync blocks for the second odd-fold speed by using error correction sync blocks thereof, outputting the second odd low-speed trick play data sync blocks, and summing the high-speed trick play data sync blocks and second odd low-speed trick play data sync blocks, thereby outputting the second odd low-speed trick play sync blocks; and, at first odd low speeds, first error-correcting the divided trick play sync blocks for all odd-fold speeds by using error correction sync blocks thereof, outputting high-speed trick play data sync blocks, summing trick play data sync blocks for the second odd-fold speed and trick play data sync blocks for the first odd-fold speed, third error-correcting the summed sync blocks by using error correction sync blocks, outputting the error-corrected first and second odd low-speed trick play data sync blocks, and summing these data sync blocks and the high-speed trick play data sync blocks, thereby outputting the first odd low-speed trick play sync blocks.

BRIEF DESCRIPTION OF THE DRAWINGS

The above objects and other advantages of the present invention will become more apparent with reference to the following detailed description of a preferred embodiment thereof, and with reference to the attached drawings, in which:

FIG. 3 is a diagram showing the division of the coefficients of each DCT block of trick play frame data according to the present invention;

DETAILED DESCRIPTION OF THE INVENTION

Figure 1:
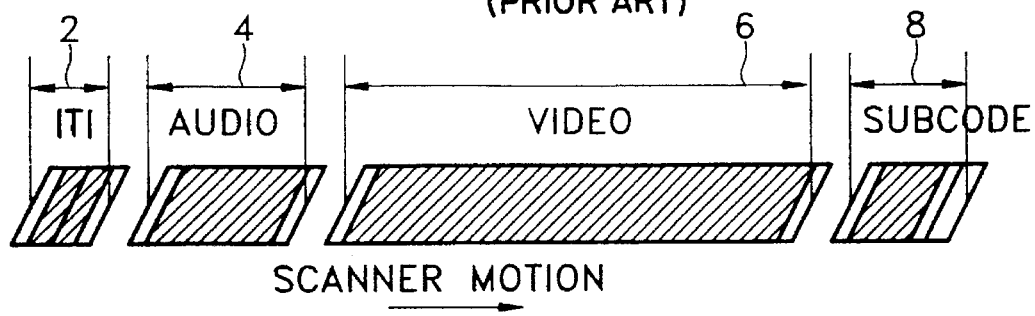
FIG. 1 depicts a track construction of digital video tape.

FIG. 1 depicts the track configuration of a digital video tap for the standard-definition VCR. ATV signals are recorded in the recording areas of the track. Video-audio data of the ATV signals for normal play are recorded on video sectors. As previously described, an unrecorded area is left on the video tape, since the bit stream for standard-definition VCRs is 24.9 Mbps and that for the ATV signal is 19.3 Mbps.

Referring to FIG. 1, an ITI (Insert and Track Information) sector 2, an audio sector 4, a video sector 6 and a subcode sector 8 appear along a track in sequence, from the beginning portion of the track. A gap exists between the respective sectors. ITI sector 2 includes a preamble area, a start sync block area, a track information area and a postamble area. Audio sector 4 and video sector 6 will be described hereinafter. Subcode sector 8 includes a preamble area, a subcode area, and a postamble area. The area beyond subcode sector 8 is an overwrite margin.

Figure 2:
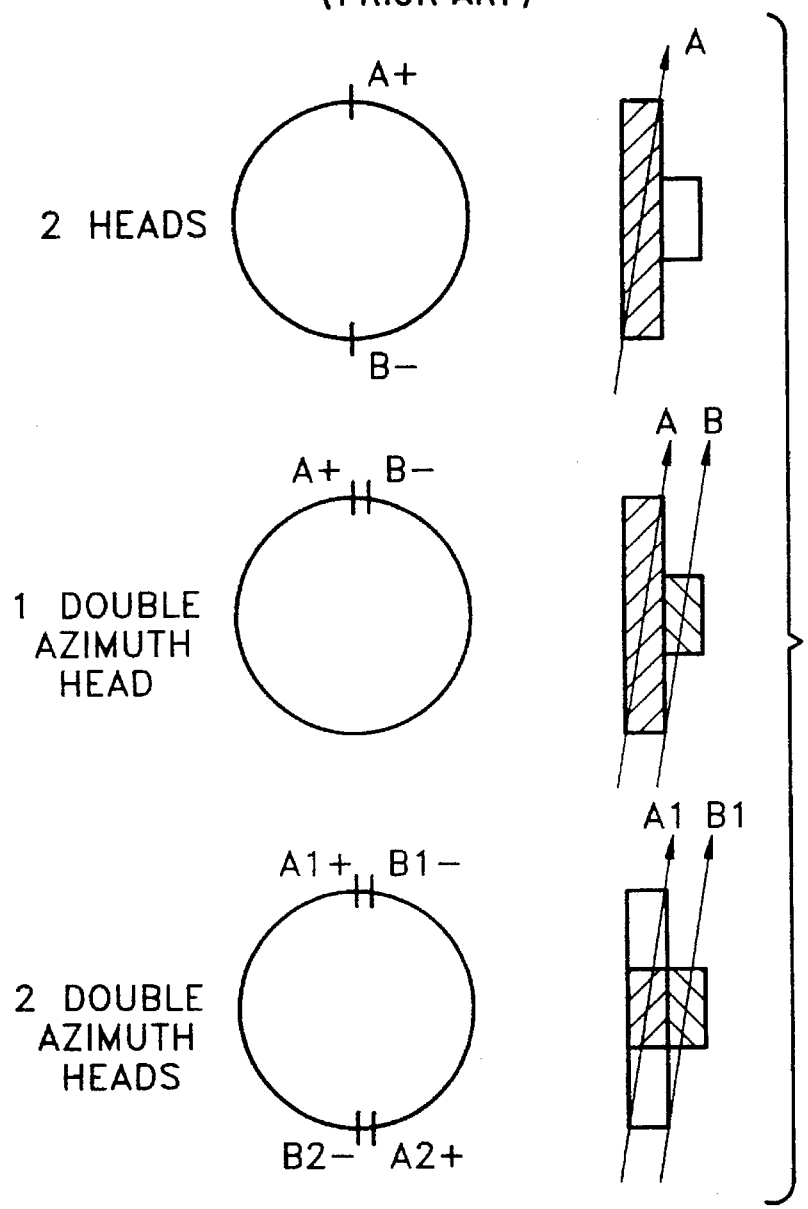
FIG. 2 depicts the structure of various scanners for scanning digital video tape.

FIG. 2 shows a variety of head structures of scanners for reproducing a standard-definition ATV signal from a digital video tape and the corresponding track scan traces. More particularly, a two head scanner, a one double-azimuth head scanner and a two double-azimuth head scanner are shown. A different format for the recording of trick play data is required for each of these various heads.

The transport bit stream of an ATV signal is repeated, for instance, in the sequence of I-P-B-B-P-B-B-P-B-B, where reference character I represents intra-frame data which can be coded independently, reference character P represents predicted frame data which can be coded from the preceding intra-frame data or predicted frame data using movement compensation, and reference character B represents bidirectional predicted frame data which can be coded from the preceding intra-frame data or predicted frame data, and from the succeeding intra-frame data or predicted frame data using movement compensation. Therefore, the intra-frame data, which can be coded independently, is selected from the normal data so as to be used as the trick play data.

Referring to FIG. 3, in a preferred embodiment of the present invention, intra-frame data corresponding to 19-fold speed is selected. The AC coefficient area of each discrete cosine transform (DCT) block of the selected intra-frame data is divided into multiple areas; for instance, into DC coefficient 31 and first AC coefficients 32 (1, 2 and 4), i.e., the first data, second AC coefficients 33 (3, 5, 7, 8 and 12), i.e., the second data, and third AC coefficients 34 (6, 9, 11, 13, 17, 18 and 24), i.e., the third data.

The first data is used at 3, 7, −11, 15, 19, −5, −9, −13, and −17-fold speeds in common. The second data are used at 3 and 7-fold speeds in common. The third data are used only at 3-fold speed. At the 3-fold speed, since the first, second and third data are all used for each DCT block data, more AC coefficients can be used than at the high speeds (which use only the first data) so that the high-frequency component of an image is improved, which enhances picture quality. At the 7-fold speed, since the first and second data are used, picture quality is held intermediate between that for the high speeds and that for the 3-fold speed.

Figure 4:
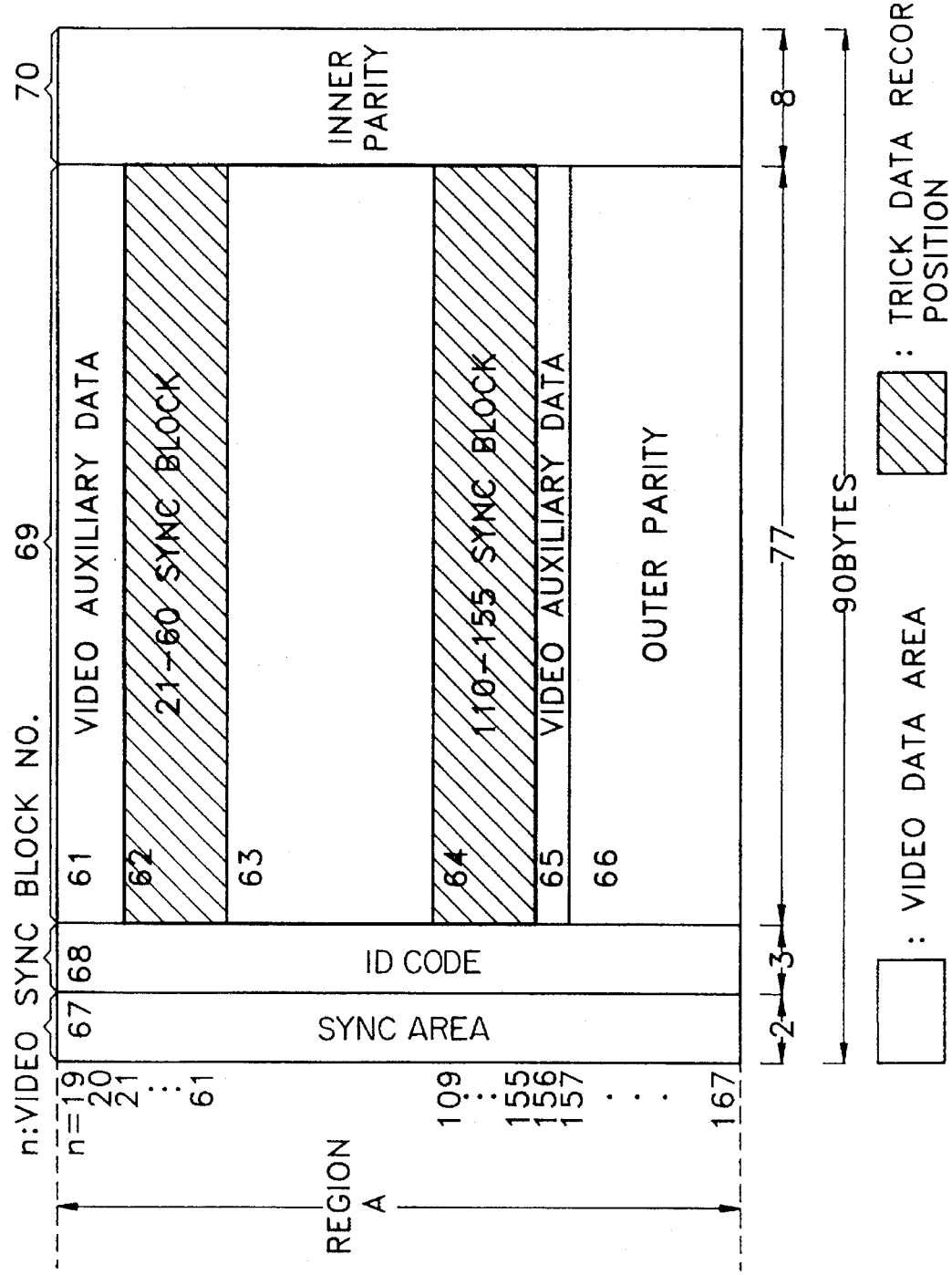
FIG. 4 depicts a record format of the video recording area for trick play on the digital video tape according to the present invention.

FIG. 4 shows a preferred embodiment of the structure of video sectors of each track of the digital video tape according to the present invention. Video sector 6 has 149 sync. blocks. That is, the video sector includes a first video auxiliary data region 61 (sync blocks 19–20), a first trick play data region 62 (sync blocks 21–60), a normal-play data region 63 (sync blocks 61–109), a second trick play data region 64 (sync blocks 110–155), a second video auxiliary data region 65 (sync blocks 156–157), and an error correction outer parity region 66 (sync blocks 158–167). Each sync block includes a two-byte sync code 67, a three-byte identification code 68, 77-byte data 69, and an eight-byte error correction inner parity code 70. First and second normal/trick play data regions 62 and 64 together constitute a region in which the pick up of trick play data is made possible at all odd-fold speeds by tracing all the scan tracks of given odd-fold speeds, e.g., 3, −5, 7, −9, 11, −13, 15, −17-fold speeds.

Figure 5:
FIG. 5 illustrates trick play data repetitively allocated on a plurality of tracks of the digital video tape according to the present invention.

The data recorded on first and second normal/trick play data regions 62 and 64 is recorded as a mixture of normal play data and trick play data, as shown in FIG. 5. More particularly, the trick play data is recorded by selecting from the intra-frame data the frame data corresponding to the maximum-fold speed, forming a plurality of sync blocks with the DC coefficients and first AC coefficient of each DCT block, and allocating 30 sync blocks for every track.

The 30 sync blocks are made up of 26 data sync blocks and four error correction code data sync blocks and are divided into sequential sync blocks a, b, c, d, e, f, g, h and i. For a track having a given azimuth, e.g., a positive azimuth, the sequential sync blocks a, b, c, d, e, f, g, h and i are recorded on first and second normal/trick play data regions 62 and 64, wherein the sync blocks are interspersely recorded at intervals of about five to seven sync blocks of normal play data, from the beginning portion of the track, in the sequence of the sync block numbers. Also, part of the sequential sync blocks a, b, c and d is interspersely recorded on a track having the opposite azimuth (i.e., a negative azimuth) in first normal/trick play data region 62, at intervals of about five to seven sync blocks of normal play data, from the central portion to the beginning portion of the track, in the sequence of the sync block numbers. In second normal/trick play data region 64, the remaining sequential sync blocks e, f, g, h and i are interspersely recorded at intervals of about five to seven sync blocks of the normal play data, from the end portion to the central portion of the track, in the sequence of the sync block numbers.

The number of the sequential sync blocks is four or five at the center of the normal/trick play data regions and two outwardly therefrom because the center region is where the envelope of a signal picked-up by the head is wide, with the signal envelope becoming narrower in the more outward regions, at odd-fold speeds such as 3, 7, 11, 15, 19, −5, −9, −13, and −17. If the speeds are even-fold, a portion in which the head scanning area overlaps becomes the center of the normal play data region of the video sectors.

For sequential sync blocks a, b, c, d, e, f, g, h and i, five or six sync blocks neighbor one another in the central portion of first and second normal/trick play data regions 62 and 64, and the number of adjacent sync blocks decreases outwardly therefrom, the only constraint being that at least two adjacent sync blocks be present. In sum, the selected frame data includes thirty sync blocks, and the series sync blocks a, b, c, d, e, f, g, h, and i are divided into nine groups: (1,2), (3,4,5,6,7,8), (9,10,11,12), (13,14), (15,16), (17,18, 19), (20,21,22,23), (24,25,26,27,28) and (29,30). Also, sequential sync blocks a, b, c, d, e, f, g, h and i, which are to be recorded on a pair of tracks having different azimuths, are recorded to lie at alternating positions with respect to each other. When data is to be picked up using such an arrangment of the trick play data, the interval between the positive-azimuth head and negative-azimuth head of the scanner is considered. Preferably, the interval comprises about six sync blocks, to ensure that data not picked up by positive-azimuth head is picked up by the negative-azimuth head.

With the present invention, since audio sector 4 is not used in recording ATV signals onto digital video tape formatted for a standard-definition VCR, trick play data for low speed is recorded on the unused audio sector 4.

Figure 6:
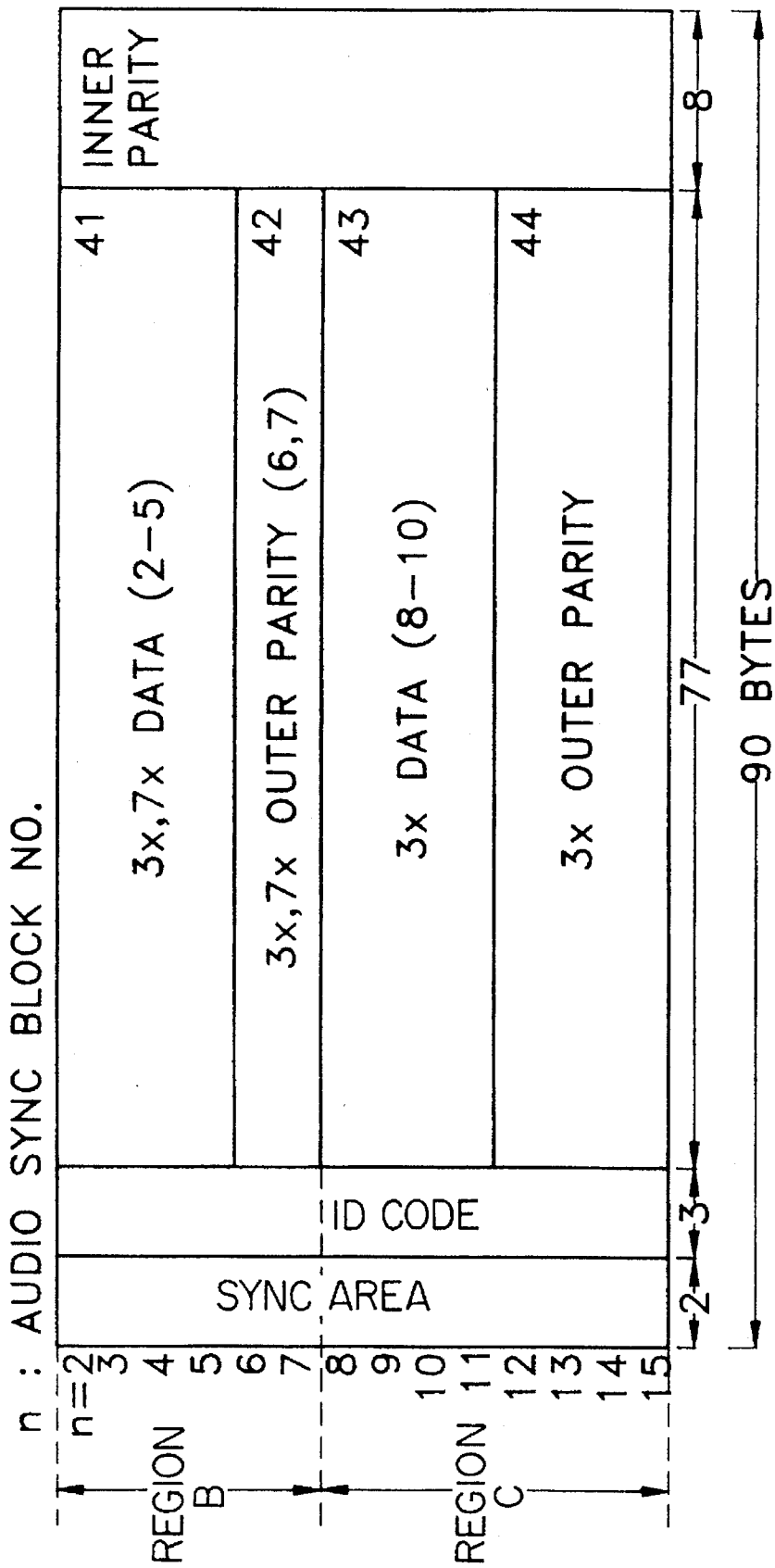
FIG. 6 depicts a record format of the audio recording area for trick play on the digital video tape according to the present invention.

Referring to FIG. 6, audio sector 4 according to the present invention includes a second low-speed (7-fold) trick play data region 41 (sync blocks 2–5), a first outer parity code region 42 (sync blocks 2–5), a first outer parity code region 42 (sync blocks 6–7) for error correcting the second low-speed trick play data, a first low-speed (3-fold) trick play data region 43 (sync blocks 8–10), and a second outer parity code region 44 (sync blocks 11–15) for error correcting the first low-speed trick play data. Therefore, the DC coefficients and first AC coefficient of respective DCT blocks are recorded on the video sector for the trick play data for 3-fold speed, and the second AC coefficients of the respective DCT blocks are recorded in the second low-speed trick play data region 41 of the audio sector. The third AC coefficients of the respective DCT blocks are recorded in the first low-speed trick play data region 43.

Figure 7:
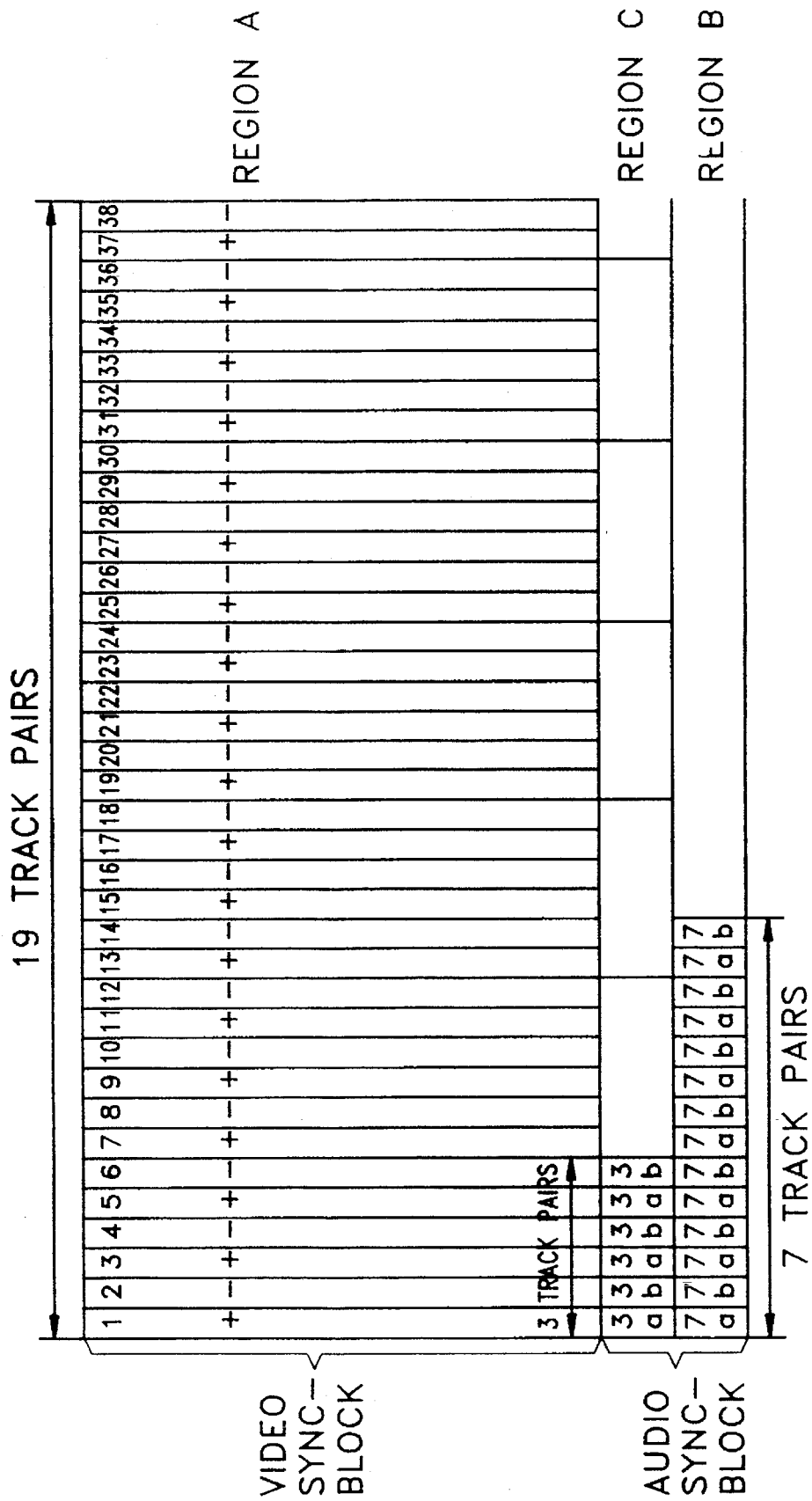
FIG. 7 illustrates trick play data repetitively recorded according to the present invention.

In other words, as shown in FIG. 7, the present invention provides a digital video tape recording method wherein an advanced television (ATV) signal is supplied at predetermined intervals and includes independently decodable frame data. This ATV signal is divided into normal play data and trick play data and recorded on a digital video tape. In this recording method, for the first data 31 and 32 of the respective DCT blocks of the intra-frame data selected from the entire intra-frame data in response to the maximum-fold speed, i.e., 19×, to be supplied as the trick play data for all-fold speeds (e.g., 3, 7, 11, 15, 19, −5, −9, −13 and −17-fold speeds), the selected portion of the intra-frame data is repetitively recorded at predetermined locations (i.e., the positions shown in FIG. 4) of each video sector of 38 tracks, i.e., 38=2×19 (the maximum speed number). For the second data 33 of the respective DCT blocks of the intra-frame data selected in response to the 19-fold speed, to be supplied as part of the trick play data for the first and second low speeds, i.e., the 3- and 7-fold speed trick play data, the frame data is repetitively recorded on the 2-fold speed trick play data region 41 of each audio sector of fourteen tracks, i.e., twice the second low speed number. Also, for the third data 34 of the respective DCT blocks of the intra-frame data selected in response to the 19-fold speed, to be supplied as part of the trick play data for 3-fold speed, the frame data is repetitively recorded on first speed trick play data region 43 of each audio sector of six tracks (i.e., twice the 3-fold speed number). That is, the second and third data of the respective blocks of the selected intra-frame data are recorded in the audio sector on a pair of tracks having opposite azimuths, with half of the frame data being recorded on each track. Therefore, the data recorded on the positive-azimuth track is different from that recorded on the negative-azimuth track.

Figure 8:
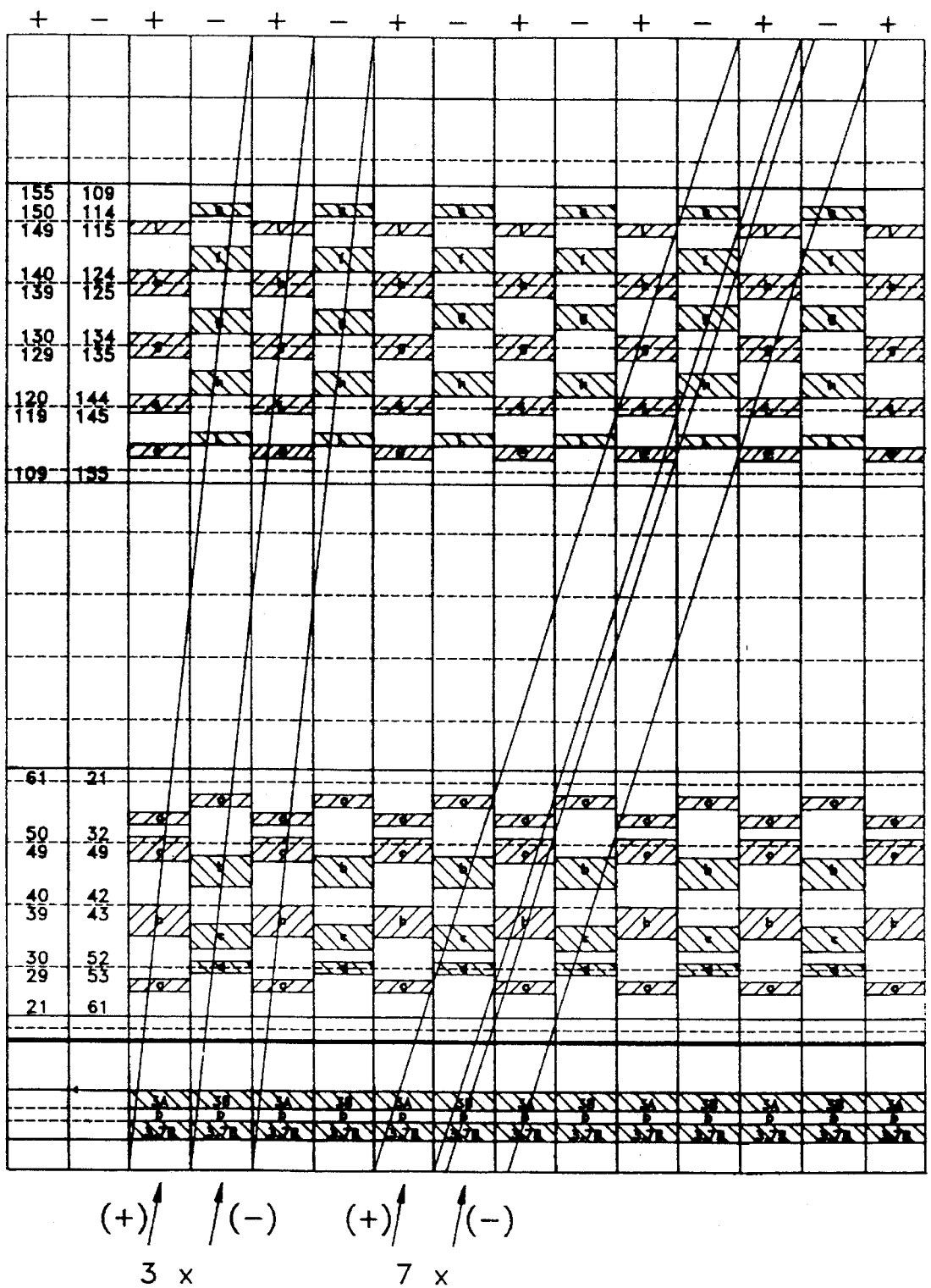
FIG. 8 illustrates a scanning pattern of digital video tape in the case of low-speed playback.

In the case of 3-fold speed, as shown in FIG. 8, 3-fold speed trick play data 3A and 7-fold speed trick play data (3, 7A) both recorded on the audio sectors and all-fold speed trick play data (a, b, h, i) recorded on the video sectors are picked up, and 3-fold speed trick play data 3B and 7-fold speed trick play data (3 and 7B) and all-fold speed trick play data (d, c, g, f, e) recorded on the video sectors are picked up by the negative-azimuth head. As a result, all-fold speed trick play data (a, b, c, d, e, f, g, h, i), 3- and 7-fold speed data (3, 7A) and (3, 7B), and 3-fold speed data (3A, 3B) are obtained, so that the high frequency characteristic is improved, and thus, a sharper picture can be achieved. Therefore, when the 19-fold speed trick play data is picked up and reproduced at 3-fold speed, the picture quality is such that, even though it takes a long time to update the image, the effect of the displayed picture is still pleasing to the eye.

In the same manner as for the 7-fold speed data, the 7-fold speed trick play data (c, d, e, f, g, b, a, i, h) are picked up to reproduce a picture. Therefore, although trick play data (3A, 3B) are not used as compared with the 3-fold speed, the pictures are held at an intermediate quality at the 7-fold speed.

Figure 9:
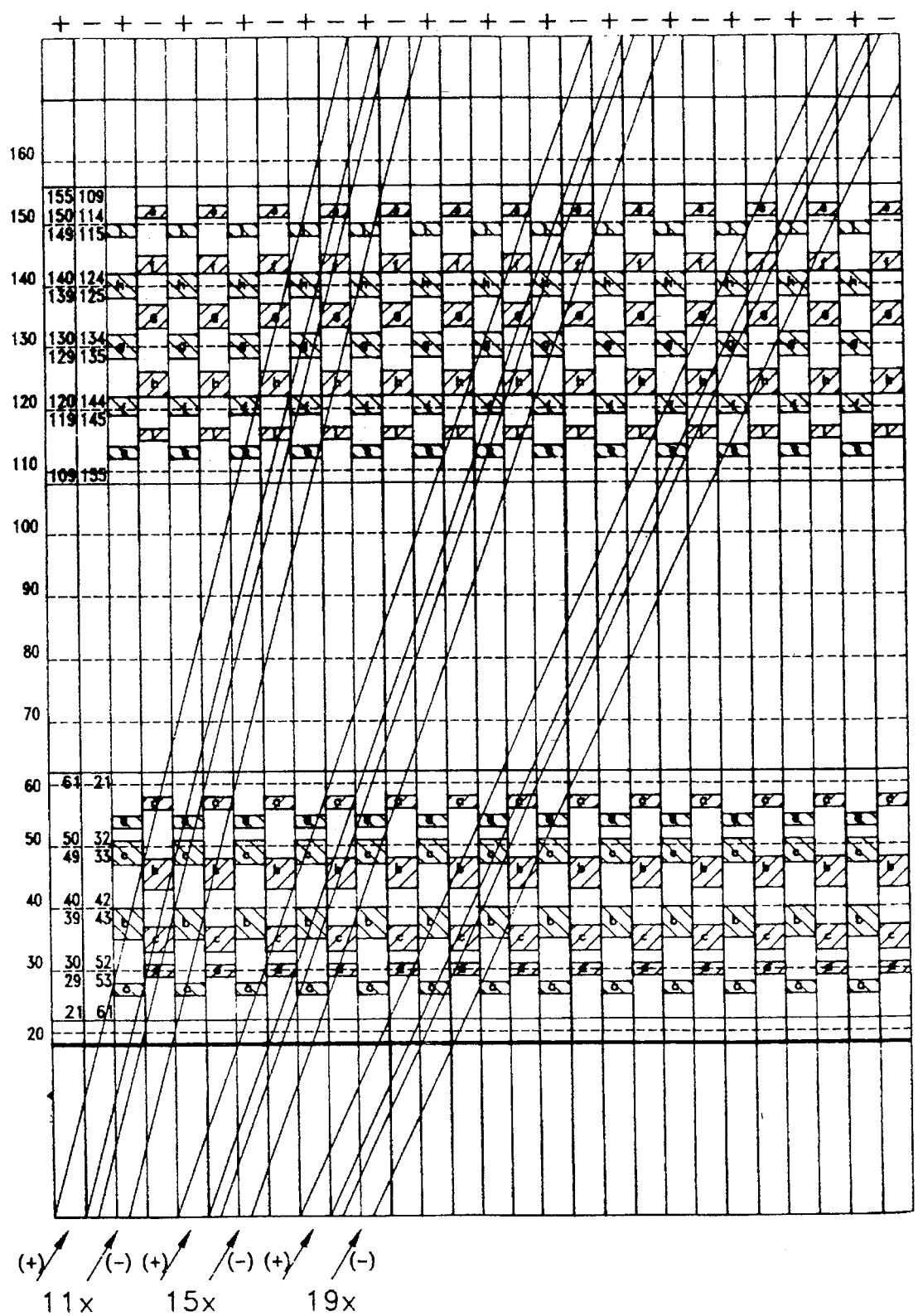
FIG. 9 illustrates a scanning pattern of digital video tape in the case of high speed playback.

At 11-, 15- and 19-fold speeds, similar to the conventional method and as shown in FIG. 9, the trick play data recorded on the video sectors are used to form a trick play picture. In other words, trick play data (a, b, e, h, i), and (d, c, a, g, f) are picked up at 11-fold speed, trick play data (a, c, d, f, g, i) and (b, i, h, f, e) are picked up at 15-fold speed, and trick play data (b, d, e, f, h) and (d, c, a, i, g, e) are picked up at 19-fold speed it the above 11-, 15- and 19-fold speeds, since only the trick play data recorded on the video sectors are picked up to reproduce a picture, the picture quality is decreased but rapidly refreshed as compared with the 3- and 7-fold speeds. Therefore, in spite of the somewhat degraded picture quality, the viewed effect is satisfactory.

As shown in FIGS. 8 and 9, since, as the speed increases to higher odd speeds, the distance between the track of the positive-azimuth head and the track-of the negative-azimuth head becomes greater, the sync blocks between the positive- and negative-azimuth tracks of the trick play data recorded on the video sectors are alternately disposed with respect to each other. In the same azimuth track, the data are disposed at intervals of five to seven sync blocks. This configuration enables playback by several different scanners and at various odd-fold speeds.

In another of its aspects, the present invention encompasses a method of reproducing the trick play data from the recording tape, wherein the data reproduced from the tape is divided into normal play sync blocks, all odd-fold speed trick play sync blocks, second odd low speed trick play sync blocks, and first odd low speed trick play sync blocks.

At odd high speeds, error correction sync blocks of all of the separated odd-fold speed trick play sync blocks are used for first error correction thereof and the error-corrected sync blocks are output as high-speed trick play reproduced data.

At the second odd low speed, the error correction sync blocks of all of the separated odd-fold speed trick play sync blocks are used for the first error correction thereof, and the high speed trick play data sync blocks are output. The error correction sync blocks of the second odd-fold speed trick play sync blocks are used for second error correction thereof, and the second odd low speed trick play data sync blocks are output. The high speed trick play data sync blocks and second odd low speed trick play data sync blocks are summed, to thereby output the second odd low speed trick play sync blocks.

At the first odd low speed, the error correction sync blocks of all of the separated odd-fold speed trick play sync blocks are used for the first error correction thereof, and the high speed trick play data sync blocks are output. The second odd-fold speed trick play sync blocks and the first odd-fold speed trick play sync blocks are summed and then third error-corrected using error-correction sync blocks. The error-corrected first and second odd low speed trick play data sync blocks are output, to be added to high speed trick play data sync blocks and output as the first odd low speed trick play sync blocks.

Figure 10:
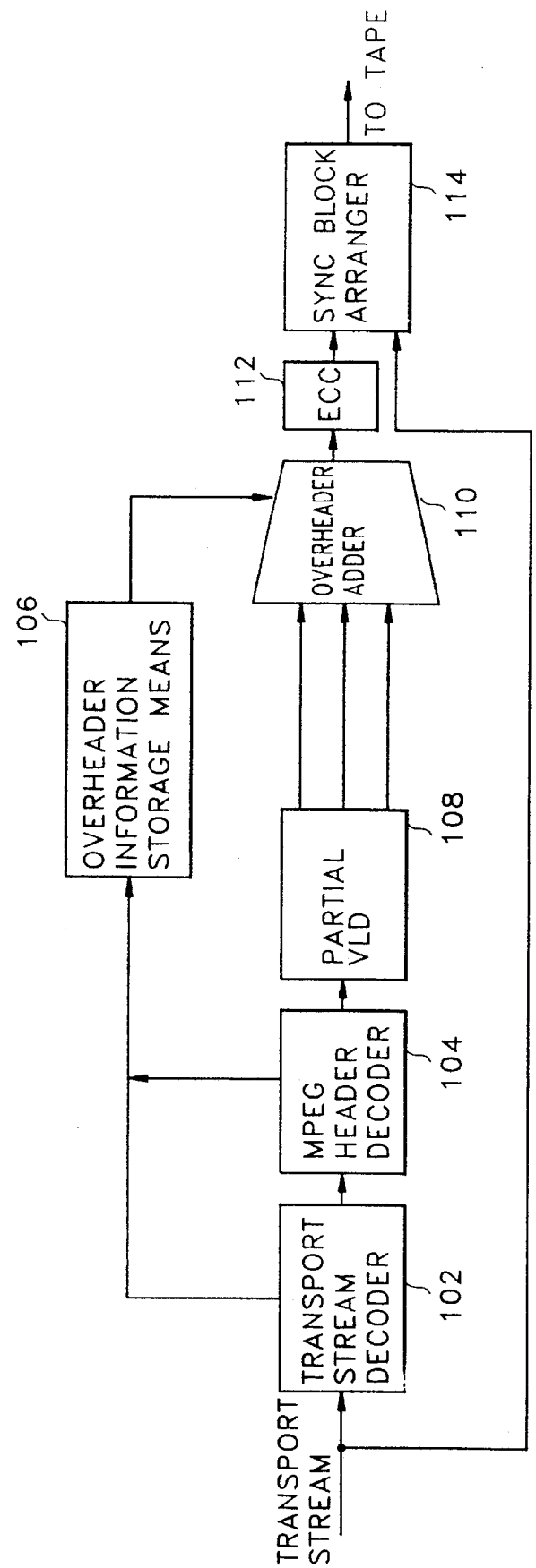
FIG. 10 is a block diagram showing the digital video tape recording apparatus according to the present invention; and, FIG. 11 is a block diagram showing a digital video tape reproducing apparatus according to the present invention.

FIG. 10 is a block diagram of a digital video tape recorder constructed in accordance with a preferred embodiment of the present invention. A transport stream is input to a transport stream decoder 102 and decoded therein. The transmission header data and information data are separated by transport stream decoder 102. The information data is input to MPEG header decoder 104 which then decodes the data and further separates therefrom the MPEG header data and information data. The transmission header data and MPEG header data are sent to and recorded in an overheader information storage means 106. The information data which is separated from the MPEG header data is sent to and decoded by a partial variable-length decoder (VLD) 108, which then outputs trick play data for multiple speeds, the second low-speed trick play data, and first low-speed trick play data. All three of these trick play data outputs are applied to overheader adder 110 and reformed along with the overheaders supplied to overheader information storage 106. An error correction code is added to the reformed information in error correction coder 112. The reformed information with error correction code is applied to sync block arranger 114 and recorded with the normal play data on the tape according to the above-described recording format.

FIG. 11 is a block diagram illustrating a digital video tape reproducing apparatus constructed in accordance with a preferred embodiment of the present invention. Data reproduced from the tape is-output by separating normal play sync blocks therefrom via normal play sync block separator 116. Meanwhile, the reproduced data is applied to trick play sync block recovery circuit 118 and output as all-fold speed trick play data, second low-speed trick play data, and first low-speed trick play data. All-fold speed trick play data is applied to first error correction decoder 122 to be error-corrected. The second low-speed trick play data is applied to the second error correction decoder 124 to be error-corrected. The second low-speed trick play data and first low-speed trick play data are summed in adder 120, and applied to the third error correction decoder 126 to be error-corrected. The first error-corrected data and third error-corrected data are summed in adder 128, and the first error-corrected data and second error-corrected data are summed in adder 130. The first error-corrected data, first summed data and second summed data are respectively applied to dummy transmission data shuffler 132 and shuffled therein. The output of shuffler 132 is output via normal/trick play selection switch 134. Alternatively, the first and second low-speed trick play data may be summed after respective error correction operations, instead of prior to third error correction decoder 126.

As described above, with the method of recording trick play data of the present invention, if the frame data corresponding to the maximum-fold speed is used without change at low speeds, even though the picture refresh rate is low and the same picture is displayed for a long time, picture quality is relatively improved and viewers are not disturbed, as compared with the high speeds.

In the above-explained embodiment of the present invention, the trick play data for the first odd low speed and second odd low speed are additionally recorded and reproduced on/from the audio tracks. However, the present invention is not limited to this particular embodiment. The present invention provides a digital video tape recording method wherein an advanced television signal, being supplied at predetermined intervals and including independently decodable frame data, is divided into normal play data and trick play data to be recorded on digital video tape. Concerning the recording method, for the DC coefficients and first AC coefficients of the respective DCT blocks of the frame data selected among the entire intra-frame data in response to the maximum odd-fold speed, to be supplied as trick play data for all-fold speeds, a portion of the frame data is repetitively recorded on predetermined spots of each video sector having a number of tracks equal to twice the the maximum odd-fold speed number. For the second AC coefficients of the respective DCT blocks of the selected frame data to be supplied as part of the trick play data for the first odd low speeds, a portion of the frame data can be repetitively recorded on the respective audio sectors having a number of tracks equal to twice the number of the first odd low speeds. In the reproducing method of the present invention, the reproduced data is divided into normal play sync blocks, all-fold speed trick play sync blocks, and first odd low-speed trick play sync blocks. At odd high speeds, error correction sync blocks of the separated all-fold speed trick play sync blocks are used for first error correction and output as high-speed trick play reproduced data. At the first odd low speed, the error correction sync blocks of the separated all-fold speed trick play sync blocks are used for first error correction, and the high-speed trick play data sync blocks are output. The error correction sync blocks of the first odd-fold speed trick play sync blocks are used for second error correction, and the first odd low-speed trick play data sync blocks are output. The high-speed trick play data sync blocks and second odd low-speed trick play data sync blocks may be summed so as to output the first odd low-speed trick play sync blocks. Further, the present invention also provides for the recording of trick play data for a third odd low speed and higher, in the same manner as that for the first and second odd low speeds.

Although several aspects and embodiments of the present invention have been described in detail hereinabove, it should be clearly understood that many variations and/or modifications of the basic inventive concepts herein taught which may appear to those skilled in the pertinent art will fall within the spirit and scope of the present invention as defined in the appended claims.

What is claimed is:

1. A digital video tape reproducing method comprising the steps of:
  dividing data reproduced from a tape into normal play sync blocks, first trick play sync blocks, second trick play sync blocks, and third trick play sync blocks, said first trick play sync blocks corresponding to trick play data for high speeds and first and second low speeds, said second trick play sync blocks corresponding to trick play data for said first and second low speeds, and said third trick play sync blocks corresponding to trick play data for said first low speed;
  at said high speeds,
    error-correcting said first trick play sync blocks using first error correction sync blocks thereof, and
    outputting high-speed trick play reproduced data;
  at said second low speed,
    error-correcting said first speed trick play sync blocks using said first error correction sync blocks thereof to produce corrected first trick play data sync blocks,
    error-correcting said second trick play sync blocks using second error correction sync blocks thereof to produce corrected second trick play data sync blocks,
    summing said corrected first trick play data sync blocks and said corrected second trick play data sync blocks, and
    outputting second low-speed trick play reproduced data; and,
  at said first low speed,
    error-correcting said first speed trick play sync blocks using said first error correction sync blocks thereof to produce said corrected first trick play data,
    summing said second trick play data sync blocks and said third trick play data sync blocks,
    error-correcting said summed second and third trick play data sync blocks using said second error correction sync blocks and third error correction sync blocks thereof to produce corrected third trick play data sync blocks,
    summing said corrected third trick play data sync blocks and said corrected first trick play data sync blocks, and
    outputting first low-speed trick play reproduced data.

2. A method according to claim 1, wherein said high speeds and said first and second low speeds are odd-fold speeds.

3. A method according to claim 2, wherein said high speeds are 11-fold, 15-fold and 19-fold speeds, said second low speed is 7-fold speed, and said first low speed is 3-fold speed.

4. A method according to claim 1, further comprising the step of:
  combining said normal play data and reproduced trick play data to form an advanced television signal.

5. A digital video tape reproducing method comprising the steps of:
  dividing data reproduced from a tape into normal play sync blocks, first trick play sync blocks, and second trick play sync blocks, said first trick play sync blocks corresponding to trick play data for high and low odd-fold speeds and said second trick play sync blocks corresponding to trick play data for said odd-fold low speeds;
  at said high odd-fold speeds,
    error-correcting said first speed trick play sync blocks using first error correction sync blocks thereof, and
    outputting high-speed trick play data; at said low odd-fold speeds,
    error-correcting said first trick play sync blocks using said first error correction sync blocks thereof to produce corrected first trick play data sync blocks,
    error-correcting said second sync blocks using second error correction sync blocks thereof to produce corrected second trick play data sync blocks,
    summing said corrected first trick play data sync blocks and said corrected second trick play data sync blocks, and
    outputting low-speed trick play data.

6. A method according to claim 5, wherein said high odd-fold speeds are 11-fold, 15-fold and 19-fold speeds, and said low odd-fold speeds are 7-fold and 3-fold speeds.

7. A method according to claim 5, further comprising the step of:
  combining said normal play data and trick play data to form an advanced television signal.

8. A digital video tape reproducing method comprising the steps of:
  dividing data from a tape into normal play sync blocks, first trick play sync blocks, second trick play sync blocks, and third trick play sync blocks, said first trick play sync blocks corresponding to trick play data for high speeds and first and second low speeds, said second trick play sync blocks corresponding to trick play data for said first and second low speeds, rand said third trick play sync blocks corresponding to trick play data for said first low speed;
  at said high speeds,
    error-correcting said first trick play sync blocks using first error correction sync blocks thereof, and
    outputting high-speed trick play reproduced data;
  at said second low speed,
    error-correcting said first speed trick play sync blocks using said first error correction sync blocks thereof to produce corrected first trick play data sync blocks,
    error-correcting said second trick play sync blocks using second error correction sync blocks thereof to produce corrected second trick play data sync blocks,
    summing said corrected first trick play data sync blocks and said corrected second trick play data sync blocks, and
    outputting second low-speed trick play reproduced data; and, at said first low speed,
error-correcting said first speed trick play sync blocks using said first error correction sync blocks thereof to produce said corrected first trick play data,
error-correcting said second trick play sync blocks using said second error correction sync blocks thereof to produce said corrected second trick play data sync blocks,
error-correcting said third trick play sync blocks using third error correction sync blocks thereof to produce corrected third trick play data sync blocks,
summing said corrected first, second and third trick play data sync blocks, and
outputting first low-speed trick play reproduced data.

9. A method according to claim 8, wherein said high speeds and said first and second low speeds are odd-fold speeds.

10. A method according to claim 9, wherein said high speeds are 11-fold, 15-fold and 19-fold speeds, said second low speed is 7-fold speed, and said first low speed is 3-fold speed.

11. A method according to claim 8, further comprising the step of:
combining said normal play data and reproduced trick play data to form an advanced television signal.

* * * * *